US009986482B2

(12) United States Patent
Panchal et al.

(10) Patent No.: US 9,986,482 B2
(45) Date of Patent: May 29, 2018

(54) MANAGING CARRIER RESTRICTIONS IN A WIRELESS NETWORK

(71) Applicant: Verizon Patent and Licensing Inc., Arlington, VA (US)

(72) Inventors: Jignesh S. Panchal, Hillsborough, NJ (US); William H. Stone, Doylestown, PA (US); Max A. Solondz, New Vernon, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 261 days.

(21) Appl. No.: 14/945,242

(22) Filed: Nov. 18, 2015

(65) Prior Publication Data

US 2017/0142632 A1    May 18, 2017

(51) Int. Cl.
  H04W 4/00       (2018.01)
  H04W 36/38      (2009.01)
  H04W 36/08      (2009.01)
  H04W 36/00      (2009.01)
  H04L 5/00       (2006.01)
  H04W 36/30      (2009.01)

(52) U.S. Cl.
  CPC ......... H04W 36/38 (2013.01); H04L 5/0041 (2013.01); H04W 36/0011 (2013.01); H04W 36/08 (2013.01); H04W 36/30 (2013.01)

(58) Field of Classification Search
  CPC ...... H04W 36/00; H04W 36/34; H04W 36/38
  See application file for complete search history.

(56) References Cited

U.S. PATENT DOCUMENTS

| 9,627,770 | B2* | 4/2017 | Svendsen | H01Q 13/106 |
| 2005/0094663 | A1* | 5/2005 | Rahman | H04L 41/00 370/466 |
| 2010/0177654 | A1* | 7/2010 | Charbit | H04B 1/7087 370/252 |
| 2011/0085536 | A1* | 4/2011 | Taoka | H04L 5/0007 370/338 |

(Continued)

OTHER PUBLICATIONS

3GPP TS 36.423 V13.1.0 (Sep. 2015), 3rd Generation Partnership Project; Technical Specification Group Radio Access Network; Evolved Universal Terrestrial Radio Access (E-UTRA); X2 Aplication Protocol (X2AP) (Release 13). http://www.3gpp.org/ftp/Specs/html-info/36423.htm.

(Continued)

*Primary Examiner* — Kevin C Harper

(57) ABSTRACT

Techniques described herein may be used to manage a wireless telecommunications network that is subject to carrier restrictions. In a handover procedure, a source base station may assign an alternative primary carrier to a user device if the current primary carrier (or a secondary carrier thereof) is prohibited by a target base station. An unpaired downlink carrier may be aggregated to the alternative primary carrier as a supplemental downlink (SDL) carrier. New primary carriers may be created by joining unpaired downlink carriers with unpaired uplink carriers. New primary carriers may include a high frequency downlink carrier and a low frequency uplink carrier. New primary carriers may be allocated to wireless devices within a coverage area based on device type and/or a signal propagation quality of each wireless device.

20 Claims, 14 Drawing Sheets

(56) References Cited

U.S. PATENT DOCUMENTS

| | | | | |
|---|---|---|---|---|
| 2011/0269469 A1* | 11/2011 | Xiao | ................. | H04W 36/0072 |
| | | | | 455/436 |
| 2012/0026976 A1* | 2/2012 | Chang | .................... | H04L 5/001 |
| | | | | 370/331 |
| 2014/0086208 A1* | 3/2014 | Murray | ............. | H04W 36/0072 |
| | | | | 370/331 |

OTHER PUBLICATIONS

3GPP TS 36.413 V13.0.0 (Jun. 2015), 3rd Generation Partnership Project; Technical Specification Group Radio Access Network; Evolved Universal Terrestrial Radio Access (E-UTRA); S1 Application Protocol (S1AP) (Release 13). http://www.3gpp.org/ftp/specs/html-info/36413.htm.

* cited by examiner

| Frequency Band Title | Frequency | Typical Usage |
|---|---|---|
| Personal Communication System (PCS) | 1900MHz Band | Voice, paging, messaging, and data services |
| Advanced Wireless Service (AWS) | Uplink: 1710-1755MHz Downlink: 2110-2155MHz | Voice, data services, video, messaging services |
| ... | ... | ... |
| Variable (Hybrid Primary Carriers) | Varies depending on carrier restrictions | Voice, paging, data services, video, messaging services |

Fig. 9

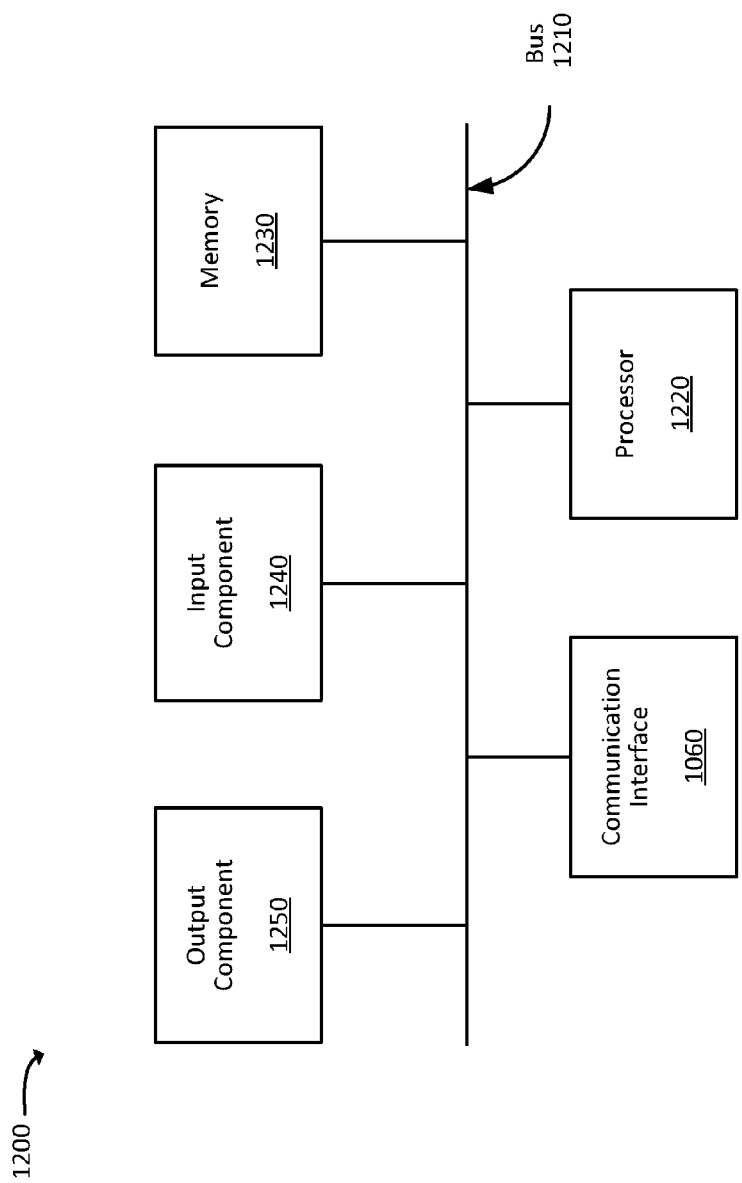

MANAGING CARRIER RESTRICTIONS IN A WIRELESS NETWORK

BACKGROUND

Wireless telecommunication networks often use carrier signals to communicate information between base stations and user devices (e.g., smartphones, tablet computers, etc.). A primary carrier signal may include an uplink carrier and a downlink carrier. The uplink carrier may be used to communicate information from a user device to a base station, and the downlink carrier may be used to communicate information from the base station to the user device. Additionally, a carrier signal may correspond to a particular range of radio frequencies. For instance, carrier signals for personal communication services (PCS) may include radio frequencies between 1850 and 1990 megahertz (MHz), and carrier signals for advanced wireless services (AWS) may include radio frequencies between 1710 and 1755 MHz for uplink carriers and radio frequencies from 2110 and 2155 MHz for downlink carriers.

In some scenarios, a range of radio frequencies (e.g., a frequency band) may be divided into both uplink carriers and downlink carriers. At times, a law or regulation may include a carrier restriction that prohibits a frequency band to only uplink carriers or downlink carriers. Carrier restrictions may apply to all of the coverage areas of a wireless telecommunications network or may only apply to certain geographic areas, such as a city, a county, a state, etc., such that some coverage areas within a wireless telecommunications network may be subjected to a carrier restriction while other coverage areas within the same network may not.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIG. 9 is a table of an example of frequency bands corresponding to primary carriers;

FIG. 12 is a diagram of example components of a device.

DETAILED DESCRIPTION OF PREFERRED EMBODIMENTS

Figure 1A:
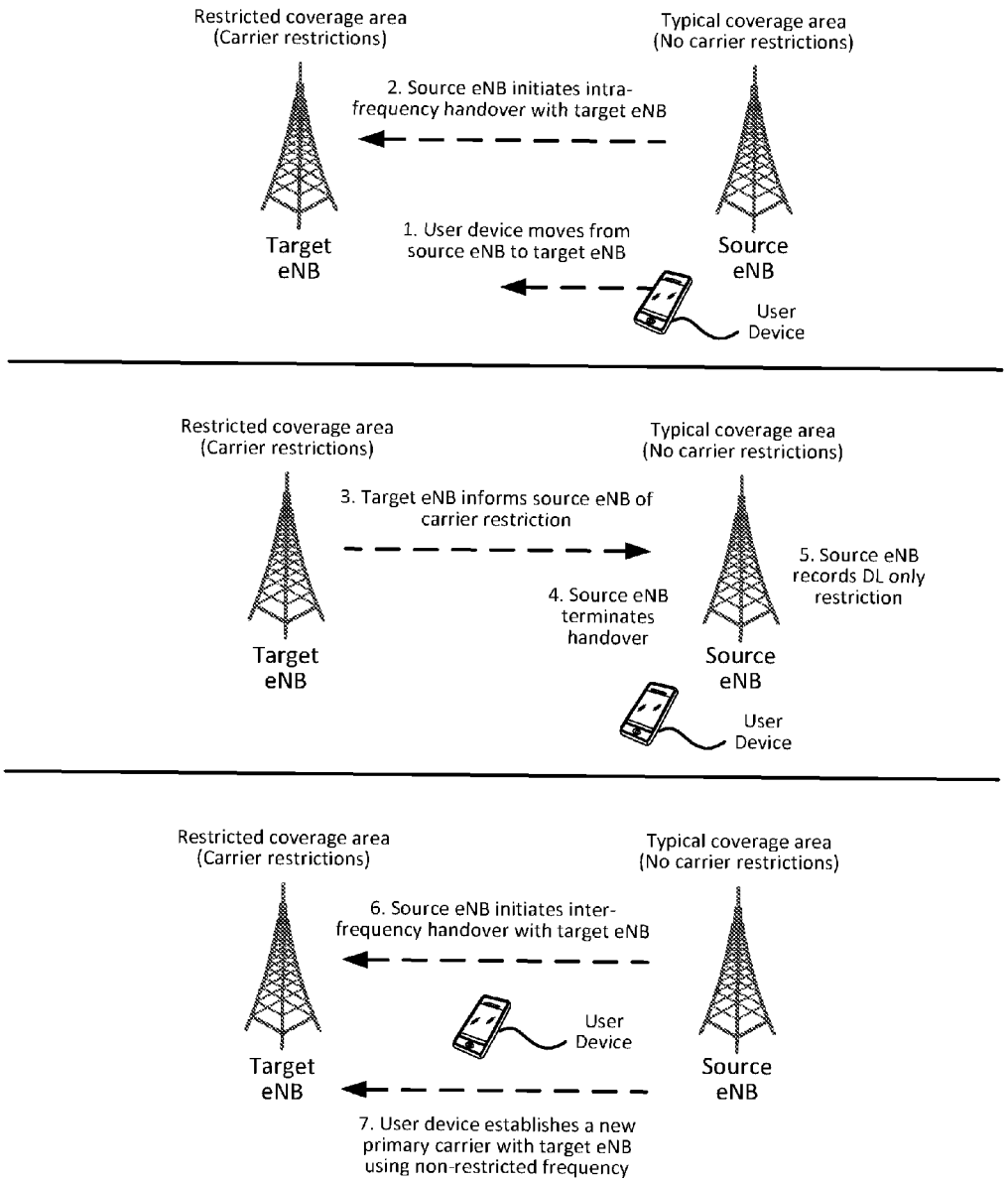
FIGS. 1A-1C illustrate an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

User devices (e.g., smartphones, tablet computers, etc.) may communicate with a base station, such as an enhanced Node B (eNB), of a wireless telecommunications network, via a primary carrier that corresponds to a particular frequency band. The primary carrier may include an uplink carrier for information sent from the user device to the eNB, and a downlink carrier for information sent from the eNB to the user device. An uplink carrier and a downlink carrier may each be referred to generally as a "primary carrier" or a "secondary carrier." A primary carrier may employ its own downlink and uplink control messages in order to allow the user device to properly communicate control information from (downlink) and to (uplink) the controlling base station. A primary carrier may act in a standalone manner. It may not need support from control messages on other primary carriers. When a user device uses a primary carrier alone, it is sometimes known as "primary cell" behavior. A secondary carrier may rely on a primary carrier and the primary carrier's downlink (and possibly on the primary carrier's uplink as well) to convey control information from (downlink) the base station (and possibly to convey control information to (uplink) the base station). This may make the secondary carrier dependent upon the primary carrier for conveyance of this control information. Thus, a secondary carrier may not be employed in a standalone manner without a supporting primary carrier.

The dominant use of a secondary carrier is to support supplemental downlink (SDL), where the downlink capacity of the primary carrier is augmented by combining the traffic handling capacity of the primary carrier's downlink with the additional downlink capacity of another secondary carrier's downlink. This secondary downlink may be in the same band or in a different band than the primary carrier's downlink signal. Furthermore, the secondary carrier's downlink may have no secondary carrier uplink associated with it. Instead, the secondary carrier's downlink may rely on the use of the primary carrier's uplink to convey both control and traffic information from the user device to the base station (eNB).

As the user device moves from one location to another, a handover procedure may be used to transfer the user device from one eNB to another eNB. While the eNB serving the user device may change as the user device moves about the network, the user device may continue to use the same primary carrier. In some scenarios, however, the user device may need to be handed over to an eNB that is subject to a carrier restriction (based on a law, regulation, etc.) that prohibits the uplink portion or the downlink portion of the primary carrier from being used by the base station in that area. Such scenarios may give rise to a dilemma where continuing with the handover procedure on the currently deployed primary carrier may be prohibited, but preventing the handover procedure may result in the user device losing control and connectivity with the wireless telecommunications network.

Techniques described herein may be used to manage a wireless telecommunications network that is subject to such carrier restrictions. For example, as described in greater detail herein, a user device may move from a coverage area without a carrier restriction to a coverage area with a carrier restriction, and the carrier restriction may prohibit either the uplink carrier or the downlink carrier (the primary carrier) from being used by the target base station (e.g., eNB) to serve the user device. A source eNB (i.e., the eNB currently serving the user device) may initiate a handover procedure directed to a target eNB (i.e., the eNB to which the user device is being transferred). As such, techniques described herein may be used to work around carrier restrictions in a wireless telecommunications network. By contrast, wireless telecommunications networks that do not include the techniques described herein may be forced to simply drop a call that corresponds to a handover procedure that is prohibited by a carrier restriction.

During the handover procedure, the target eNB may inform the source eNB that the handover procedure on that primary carrier is prohibited because the primary carrier currently used by the user device on the source eNB conflicts with the carrier restriction of the target eNB. As a result, the source eNB may either initiate an intra-frequency handover procedure with another eNB without the carrier restriction (assuming such an eNB is available), or to initiate an inter-frequency handover procedure with the target eNB, whereby the user device may acquire a new primary carrier, that corresponds to a different frequency band, when transferred from the source eNB to the target eNB. As such, techniques described herein may be used to work around carrier restrictions in a wireless telecommunications network.

In some implementations, since a carrier restriction may only prohibit an uplink carrier or a downlink carrier of the primary carrier from being used, the eNB and the user device may continue to use that portion of the primary carrier that is not prohibited by the carrier restriction. For example, if the carrier restriction prohibits the uplink portion of the primary carrier from being used in that area (where the user device transmits the uplink signal to be received by the eNB receiver), the source eNB may first assign a new primary carrier to the user device (e.g., a carrier that includes a different uplink carrier and a different downlink carrier), and since the original downlink carrier of the original primary carrier (from the source eNB) is not restricted in the target eNB, the original downlink carrier may continue to be used in the target eNB, but not as the primary carrier.

Instead, the original downlink carrier may continue to be used by the user service as a supplemental downlink (SDL) carrier to enhance the downlink capacity of the new primary carrier. In some implementations, the original downlink carrier may instead be paired with an unpaired uplink carrier to make a new primary carrier (also referred to as a hybrid carrier) and the new primary carrier may be assigned to the user device as a result of the handover procedure. Additionally, in some implementations, a hybrid carrier (e.g., a new carrier that is formed by pairing an unpaired downlink carrier with an unpaired uplink carrier) may be asymmetric in the sense that the secondary carries may have different data transfer capacities. For instance, the downlink portion of the hybrid carrier may have a greater capacity for transferring data (e.g., at a higher rate) than the corresponding uplink carrier.

In another example, the target eNB may be subject to multiple carrier restrictions. For instance, a first carrier restriction may prohibit the uplink carrier of the source primary carrier from being used in the target eNB, and a second carrier restriction on the target cell may also prohibit other downlink carriers corresponding to another frequency band. Here, we can label the downlink carrier of the source primary carrier a 'first' orphan' downlink, because its corresponding uplink carrier is prohibited from operation in the target cell. Additionally, we can label the other band uplink carrier a 'second' orphan' uplink, because the corresponding downlink carrier on the other band is also prohibited from operation in the target cell. Here, a new capability may be desired.

The target base station may pair (or caused to be paired) the first orphan downlink carrier, corresponding to the first carrier restriction in the target cell, with a second orphan uplink carrier, corresponding to the second carrier restriction in the target cell. This new pairing within the target cell may be used in order to create a new primary carrier (also referred to herein as a hybrid primary carrier) made up from the unpaired (first orphan) downlink and (second orphan) uplink carriers. These two orphaned carrier portions are not in the same band (an hence we may label them a 'hybrid' primary carrier.) As such, when the user device is transferred to the target eNB as part of the handover procedure, the new primary carrier used by the target eNB may be this hybrid primary carrier. As such, techniques described herein may enable an eNB to create new primary carriers (e.g., hybrid primary carriers) from unpaired carrier portions. These unpaired carrier portions are caused by carrier use restrictions in certain areas.

One example of such restrictions may occur in the 600 MHz Incentive Auction spectrum bands. In some areas, spectrum designated for wireless use may be confiscated by the Federal Communications Commission (FCC) in order to support additional digital television (DTV) stations in crowded urban television (TV) markets. The FCC may reinsert such DTV stations into the wireless uplink channels or into the downlink channels. Thus these corresponding primary carrier downlink channels may be orphaned (orphaned from uplink) or these corresponding primary carrier uplink channels may be orphaned (orphaned from downlink). These conditions depend upon where the FCC performs these DTV re-insertions.

Another example of a frequency band that may experience blocked use of various primary carrier frequencies is Band 4 (AWS-1 band) and Band 66 (AWS-1, AWS-3, & AWS-4 band portions). Coordination with incumbent military users in portions of the AWS-3 band may prohibit certain spectrum portions in the AWS-3 uplink portion (1755-1780 MHz) from being used. This would leave orphaned downlink portions in AWS-3 band (2155-2180 Band).

Figure 1B:
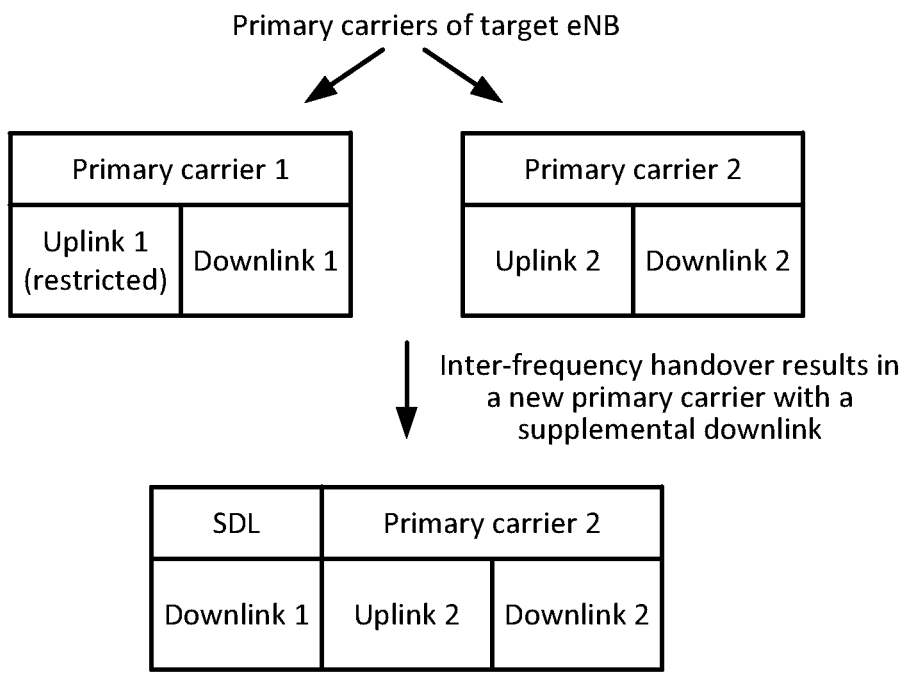
Figure 1C:
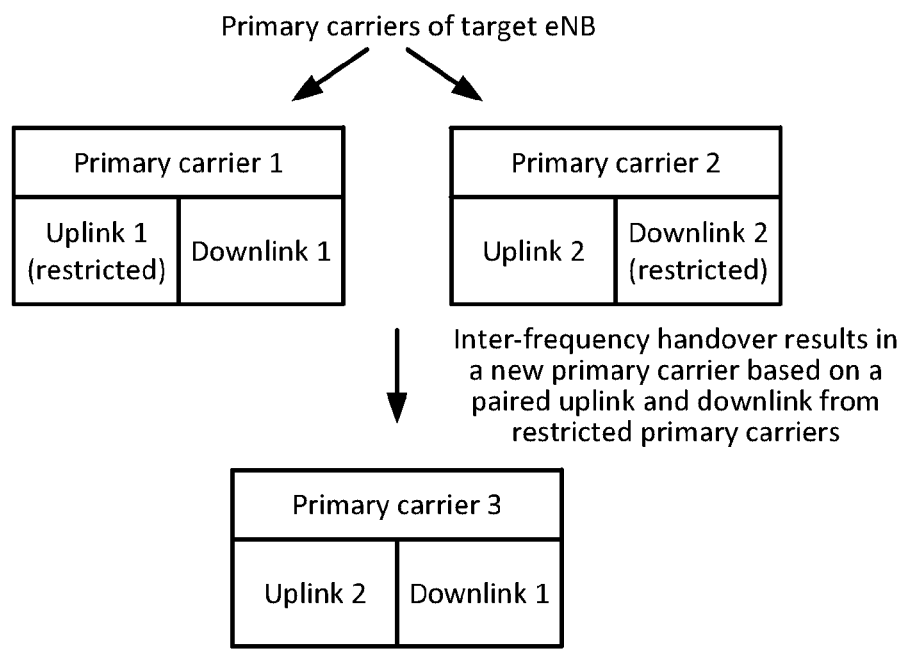

FIGS. 1A-1C illustrate an example overview of an implementation described herein. As shown in FIG. 1A, a user device may move from a from a source eNB to a target eNB (at 1). The source eNB may include a typical coverage area that does not include any carrier restrictions, and the target eNB may include an atypical coverage area that is subject to one or more carrier restrictions. As the user device moves toward the target eNB, the source eNB may initiate an intra-frequency handover with the target eNB (at 2). As used herein, an intra-frequency handover may include a handover procedure where the user device maintains the same primary carrier before and after the procedure. By contrast, an inter-frequency handover, as used herein, may include a handover procedure where the user device obtains a new primary carrier as a result of the handover procedure. It should be noted that while eNBs may include primary carriers that operate in the same or similar frequency ranges; the primary carriers for eNB are separate and independently used and managed by each eNB.

During the intra-frequency handover, the target eNB may inform the source eNB that the handover procedure is prohibited because the carrier restriction applies to the primary carrier used by the target eNB (at 3). In response, the source eNB may terminate the intra-frequency handover procedure (at 4). The source eNB may also create a record of the carrier restriction and may store the record locally (at 5) so that, prior to subsequent handover procedures, the source eNB may determine if the handover procedures to that target eNB on that primary carrier would be prohibited by the carrier restriction at the target eNB.

Subsequently or alternatively, the source eNB may initiate an inter-frequency handover to the eNB (at 6), thus employing a different primary carrier for the target eNb. As mentioned above, an inter-frequency handover may include a handover procedure where the user device acquires a new primary carrier that does not conflict with a carrier restriction. As such, as the user device is transferred to the target eNB, the user device may obtain a new primary carrier to communicate with the target eNB without violating the carrier restriction of the target eNB (at 7). As such, the user device may move from one coverage area to another, within a wireless telecommunications network, without being prohibited from traveling to areas limited by carrier restrictions that may apply to certain frequency bands and coverage areas.

Referring now to FIG. 1B, in one example, a target eNB may include multiple carriers that were primary carriers in the source eNb (e.g., primary carrier 1 and primary carrier 2) and one or more of these primary carriers may be subject to a carrier restriction in the target cell location. Thus, at the target cell location, these same carriers may not be employed as primary carriers. For instance, as depicted, the uplink carrier (uplink 1) of primary carrier 1 may be subject to a restriction requirement that does not apply to the downlink carrier (downlink 1) of primary carrier 1, nor the uplink and downlink carriers (uplink 2 and downlink 2) of primary carrier 2. Prior to an inter-frequency handover from a source eNB to the target eNB, a user device may be using primary carrier 1 to send and/or receive information to and/or from the source eNB. However, as a result of the inter-frequency handover, the user device may switch to primary carrier 2 to communicate with the target eNB. Additionally, since the carrier restriction only applies to uplink 1, and in accordance with some implementations, the user device may continue to use downlink 1 as a supplemental downlink to primary carrier 2.

In another example, shown in FIG. 1C, the target eNB may be subject to multiple carrier restrictions. For instance, one carrier restriction may apply to the uplink carrier (uplink 1) of primary carrier 1, and another carrier restriction may apply to the downlink carrier (downlink 2) of primary carrier 2. In light of the carrier restrictions, the target base station may pair the unrestricted downlink carrier (orphaned downlink 1) of primary carrier 1 with the unrestricted uplink carrier (orphaned uplink 2) of primary carrier 2, thereby creating a new primary carrier (primary carrier 3, which may be considered a hybrid primary carrier, made up of downlink 1 and uplink 2 paired together). As such, prior to the inter-frequency handover from a source eNB to a target eNB, the user device may be using primary carrier 1 to send and receive information to the source eNB. However, as a result of the inter-frequency handover, the user device may switch to the new primary carrier (primary carrier 3) to communicate with the target eNB. This ability to create a new primary carrier (example, primary carrier 3) by pairing together arbitrary orphaned uplink and downlink spectrum portions is a new feature. These newly formed hybrid primary carriers do not correspond to a conventional standardized FDD pairing.

Figure 2:
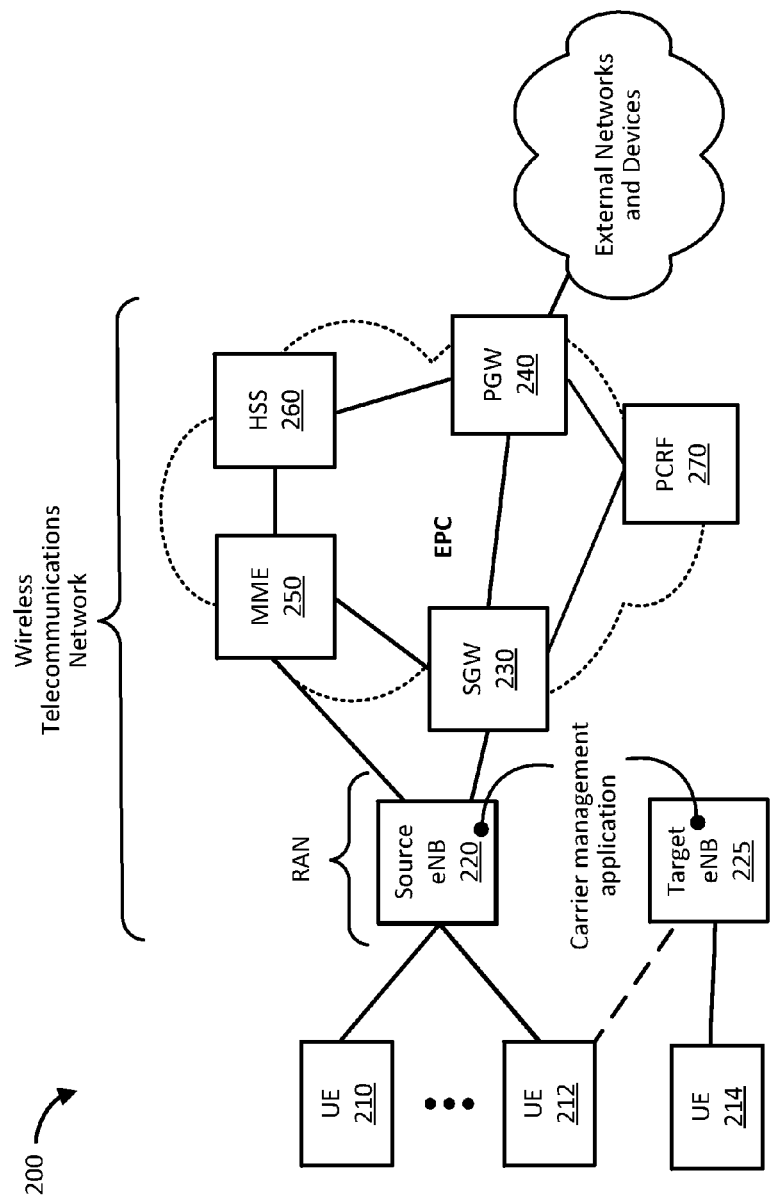
FIG. 2 is a diagram of an example environment in which systems and/or methods described herein may be implemented.

FIG. 2 is a diagram of an example environment 200 in which systems and/or methods described herein may be implemented. Environment 200 may include user devices 210, 212, 214, a wireless telecommunications network, and external networks. While FIG. 2 includes user devices 210, 212, and 214, other examples of user devices, as described herein, may simply be referred to as user device 210 or user devices 210. The wireless telecommunications network may include an Evolved Packet System (EPS) that includes a Longer Term Evolution (LTE) network and/or an evolved packet core (EPC) network that operates based on a 3rd Generation Partnership Project (3GPP) wireless communication standard. The LTE network may be, or may include, radio access network (RANs) that include one or more base stations, some or all of which may take the form of eNBs 220 and 225, via which user devices 210 and 212 may communicate with the EPC network. While FIG. 2 includes eNBs 220 and 225, other examples of eNBs, as described herein, may simply be referred to as eNB 220 or eNBs 220.

The EPC network may include Serving Gateway (SGW) 230, PDN Gateway (PGW) 240, Mobility Management Entity (MME) 250, Home Subscriber Server (HSS) 260, and/or Policy and Charging Rules Function (PCRF) 270. As shown, the EPC network may enable user devices 210 to communicate with an external network, such as a Public Land Mobile Networks (PLMN), a Public Switched Telephone Network (PSTN), and/or an Internet Protocol (IP) network (e.g., the Internet).

User devices 210, 212, 214, etc., may include a portable computing and communication devices, such as a personal digital assistant (PDA), a smart phone, a cellular phone, a laptop computer with connectivity to the wireless telecommunications network, a tablet computer, etc. User devices 210, 212, 214, etc may also include a non-portable computing device, such as a desktop computer, a consumer or business appliance, or another device that has the ability to connect to a RAN of the wireless telecommunications network. User devices 210, 212, 214, etc., may be capable of traveling from a coverage area of one RAN to the coverage area of another RAN. In so doing user device 212 may be involved in an inter-frequency handover (on the same defined frequency division duplex (FDD) or time division duplex (TDD) 3GPP Band) and/or an intra-frequency handover (between two different defined FDD or TDD 3GPP Bands). An intra-frequency handover procedure may include a handover procedure where user device 212 maintains the same primary carrier before and after the handover procedure. By contrast, an inter-frequency handover may include a handover procedure where user device 212 changes primary carriers as a result of the handover procedure.

eNB 220 may include one or more network devices that receives, processes, and/or transmits traffic destined for and/or received from user device 210 (e.g., via an air interface). Depending on the scenario, eNB may be a source eNB (220) or a target eNB (225). A source eNB 220 may include an eNB that is transferring user device 212 to another eNB 225 as part of a handover procedure, while a target eNB 225 may include the eNB 225 that is receiving user device 212 as part of the handover procedure. eNB 220 may include software (such as a carrier management application) that may enable eNB 220 to perform one or more of the operations described herein.

For example, as mentioned above, the handover procedure may include an inter-frequency handover or an intra-frequency handover. If the target eNB 225 is not subject to a carrier restriction (or is subject to a carrier restriction that does not pertain to the primary carrier between user device 212 and the source eNB 220), the handover procedure may include an intra-frequency handover since there may be no need to change the primary carrier. By contrast, if the target eNB 225 is subject to a carrier restriction that pertains to the primary carrier between user device 212 and the source eNB 220, the handover procedure may include an inter-frequency handover procedure since user device 212 is required to change primary carriers when moving to target eNB 225. Depending on the available bands and the implementations, the new primary carrier used for the resulting inter-frequency handover may be a new primary carrier in a different band, a new primary carrier (supporting) with a SDL, or a primary carrier formed from an unpaired uplink carrier and an unpaired downlink carrier (a hybrid carrier formed by pairing two orphaned spectrum portions).

SGW 230 may aggregate traffic received from one or more eNBs 220 (and 225) and may send the aggregated traffic to an external network or device via PGW 240. Additionally, SGW 230 may aggregate traffic received from one or more PGWs 240 and may send the aggregated traffic to one or more eNBs 220. SGW 230 may operate as an anchor for the user plane during a handover procedure and as an anchor for mobility between different telecommunication networks. PGW 240 may include one or more network devices that may aggregate traffic received from one or more SGWs 230, and may send the aggregated traffic to an external network. PGW 240 may also, or alternatively, receive traffic from the external network and may send the traffic toward user device 212 (via SGW 230 and/or eNB 220).

MME 250 may include one or more computation and communication devices that act as a control node for eNBs 220 and 225 and/or other devices that provide the air interface for the wireless telecommunications network. For example, MME 250 may perform operations to register user device 212 with the wireless telecommunications network, to establish bearer channels (e.g., traffic flows) associated with a session with user device 212, to hand off user device 212 to a different eNB 225, MME, or another network, and/or to perform other operations. MME 250 may perform policing operations on traffic destined for and/or received from user device 212.

HSS 260 may include one or more devices that may manage, update, and/or store, in a memory associated with HSS 260, profile information associated with a subscriber (e.g., a subscriber associated with user device 212). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with user device 212. Additionally, or alternatively, HSS 260 may perform authentication, authorization, and/or accounting operations associated with the subscriber and/or a communication session with user device 212.

PCRF 270 may receive information regarding policies and/or subscriptions from one or more sources, such as subscriber databases and/or from one or more users. PCRF 270 may provide these policies to PGW 240 or another device so that the policies can be enforced. As depicted, in some implementations, PCRF 270 may communicate with PGW 240 to ensure that charging policies are properly applied to locally routed sessions within the telecommunications network. For instance, after a locally routed session is terminated, PGW 240 may collect charging information regarding the session and provide the charging information to PCRF 270 for enforcement.

Figure 3:
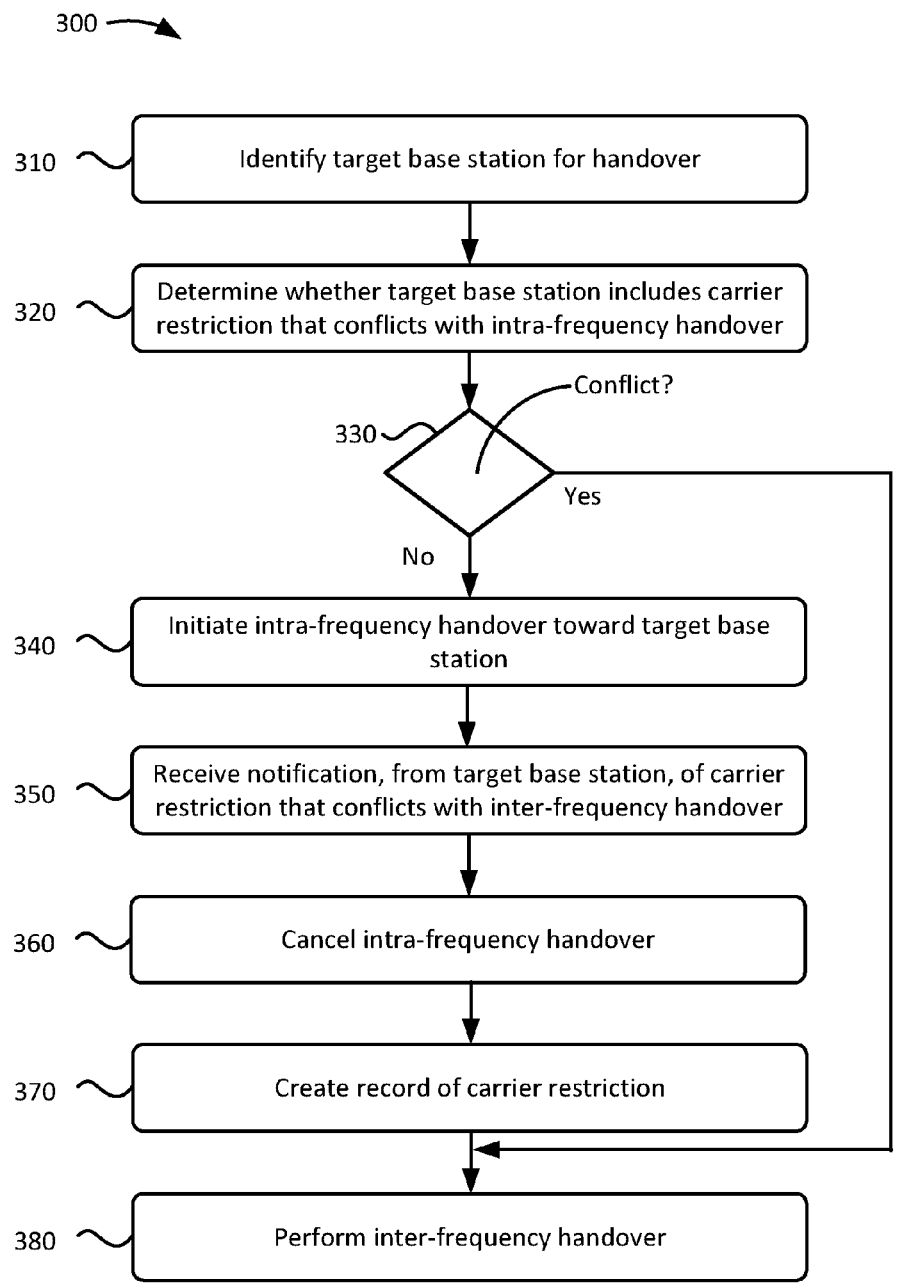
FIG. 3 is a flowchart diagram of an example process for performing an inter-frequency handover.

FIG. 3 is a flowchart diagram of an example process 300 for performing an inter-frequency handover as a result of carrier restrictions. In some implementations, process 300 may be implemented by eNB 220. In some implementations, process 300 may be performed by eNB 220 in combination with one or more other devices of a core network. Process 300 is presented from the perspective of eNB 220 operating as a source eNB and is therefore referred to below as source eNB 220.

As shown, process 300 may include identifying a target base station (eNB 225) for a handover (block 310). For instance, as user device 212 moves about a wireless telecommunications network, source eNB 220 may detect a need to transfer user device 212 to another eNB 225 (referred to as target eNB 225) via a handover procedure. In some implementations, source eNB 220 may identify target eNB 225 based on information from user device 212 (e.g., a user device measurement report).

Process 300 may include determining whether the target base station (eNB 225) includes a carrier restriction that would conflict with an intra-frequency handover (block 320). For example, source eNB 220 may access locally-store information that includes one or more of the surrounding possible target eNBs 225 that are known to include carrier restrictions. The information for each possible target eNB may also include a description of uplink and/or downlink carriers that are prohibited by the carrier restrictions on that target eNB, such that source eNB 220 may determine if a handover (e.g., an intra-frequency handover) of a particular user device 212 would conflict with any known carrier restrictions of a specific target eNB 225.

In some implementations, the information may be updated each time source eNB 220 encounters a new carrier restriction (as will be described below with reference to blocks 340 and 360). As such, it may be possible for target eNB 225 to include a new carrier restriction that is not described by the information already stored by a source eNB 220, since the carrier restriction may not have been discovered by source eNB 220. In some implementations, each time a new carrier restriction is applied to a particular eNB 225 in a wireless telecommunications network, the other (source) eNBs 220 in the network may be notified so that each eNB 220 may have up-to-date information about carrier restrictions in the surrounding target eNBs (eNB 225) within the network. eNBs 220 database (list) may also be updated if/when a carrier restriction is removed from a particular target eNB 225.

If source eNB 220 determines that target eNB 225 does have a carrier restriction that would conflict with the handover (block 330—Yes), process 300 may include performing an inter-frequency handover of user device 212 (block 380). By contrast, if source eNB 220 determines that target eNB 225 does not have a carrier restriction that would conflict with the handover (block 330—No), process 300 may include initiating a conventional intra-frequency handover toward the target base station (block 340). For instance, source eNB 220 may send a handover request message to target eNB 225, including information that is required by target eNB 225 to complete the intra-frequency handover (e.g., the identity of user device 212, information describing the primary carrier, etc.). In some implementations, the intra-frequency handover may be performed in accordance with a known standard, such as the 3GPP standard.

Alternatively, process 300 may include receiving a notification, from the target base station, of a carrier restriction that conflicts with the use of conventional intra-frequency handover (block 350). For instance, source eNB 220 may receive a message from target eNB 225 that completing that intra-frequency handover is prohibited because it would involve user device 212 using a carrier (e.g., an uplink carrier or a downlink carrier) that has been restricted at the target cell location (eNB 225). In some implementations, the notification may be sent via an X2 Application Protocol (X2AP) interface between the target eNB 225 and the source eNB 220. In some implementations, target eNB 225 may send the notification to source eNB 220 via an S1AP interface that connects eNBs 220, 225 with MME 250.

Additionally, the notification may include a negative acknowledgement message (e.g., a 3GPP Handover Preparation Failure message). The message may indicate that the intra-frequency handover has failed. The message may also indicate the reason for the failure. For instance, if the carrier restriction corresponds to an uplink carrier of the primary carrier being used by user device 212, the message may indicate that only the downlink carrier would be permitted by target eNB 225. If the notification from target eNB 225 includes a 3GPP Handover Preparation Failure message the message may include "DL only" (or a corresponding 3GPP code) as a "cause" for the failure, which may indicate to source eNB 220 that only the downlink portion of the primary carrier is permitted.

Process 300 may include canceling the intra-frequency handover (block 360). For example, source eNB 220 may terminate the intra-frequency handover in response to receiving the notification from target eNB 225 that the handover is prohibited. In some implementations, source eNB 220 may cancel the intra-frequency handover in accordance with the 3GPP standard, which may include communicating with target eNB 225 via the X2AP interface and/or MME 250 via the S1AP interface.

Process 300 may include creating a record of the carrier restriction (block 370). For instance, source eNB 220 may update the information stored locally about carrier restrictions within the wireless telecommunications network. The record may include an identifier of target eNB 225 and a description of the carrier restriction so that the next time source eNB 220 attempts a handover procedure involving target eNB 225, source eNB 220 will be able to determine in advance (e.g., before having to attempt the handover) whether the handover procedure is prohibited.

Process 300 may include performing an inter-frequency handover (block 380). For example, source eNB 220 may perform an inter-frequency handover in response to being notified that an intra-frequency handover is prohibited by a carrier restriction of target eNB 225. As mentioned above, the inter-frequency handover may cause user device 212 to establish a different primary carrier (e.g., a primary carrier that does not conflict with the carrier restriction at eNB 225).

Depending on the implementation, the new primary carrier may be established prior to, during, or as a result of, the handover procedure.

Figure 4:
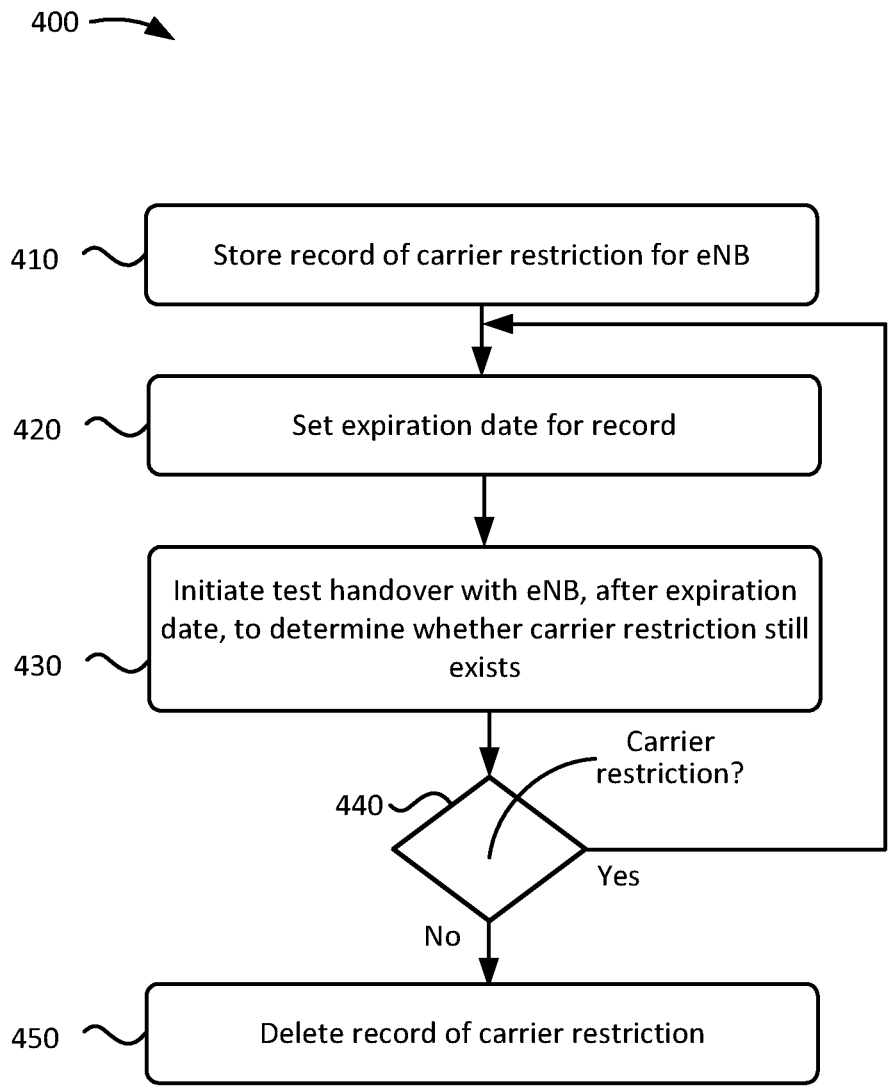
FIG. 4 is a flowchart diagram of an example process for updating information regarding a carrier restriction in a wireless telecommunications network.

FIG. 4 is a flowchart diagram of an example process 400 for updating information regarding a carrier restriction in a wireless telecommunications network. In some implementations, process 400 may be implemented by eNB 220. In some implementations, process 400 may be performed by eNB 220 in combination with one or more other devices of a core network. Process 400 is presented from the perspective of eNB 220 operating as a source eNB, and is therefore referred to below as source eNB 220.

As shown, process 400 may include storing a record of a carrier restriction for another eNB 225 (block 410). For instance, source eNB 220 may create a record of a carrier restriction that has been applied to another eNB 225. As discussed above with reference to FIG. 3, eNB 220 may create the record in response to receiving a notification from another eNB 225 that an intra-frequency handover is prohibited. In some implementations, eNB 225 may also communicate the record to other eNBs 220 within the wireless telecommunications network to keep the entire network up-to-date regarding carrier restrictions that are in effect at location of eNB 225.

Process 400 may include setting an expiration date for the record (block 420). For example, eNB 220 may associate the record with a date that corresponds to a preselected (or default) duration measured from a creation date of the record. For instance, if the default duration of an expiration date of three month, eNB 220 may set the expiration date of the record as three months from the date that the record is created.

Process 400 may include initiating a test handover with the eNB 225, after the expiration date, to determine whether the carrier restriction still exists (block 430). For example, at some point after the expiration date associated with the record, eNB 220 may initiate a test handover with the eNB associated with the record (eNB 225). The test handover request may help determine whether the carrier restriction still exists. For example, the test handover may include communicating, to the eNB associated with the record (eNB 225), a handover request involving a primary carrier that would conflict with the carrier restriction if the carrier restriction is still in effect.

If the carrier restriction is still in effect (block 440—Yes), process 400 may include setting another expiration date for the record (block 420). However, if the carrier restriction is no longer in effect (block 440—No), process 400 may include deleting the record of the carrier restriction (block 450). For instance, eNB 220 may delete the information about the carrier restriction in order to maintain up-to-date information of carrier restrictions within the wireless telecommunication network. In some implementations, eNB 225 may also notify other eNBs 220 (e.g., eNBs 220 that might also perform a handover procedure with the eNB 225 associated with the carrier restriction) that the carrier restriction is no longer in effect. In this manner, eNB 225 may help other eNBs 220 to have up-to-date information regarding the carrier restriction.

Figure 5:
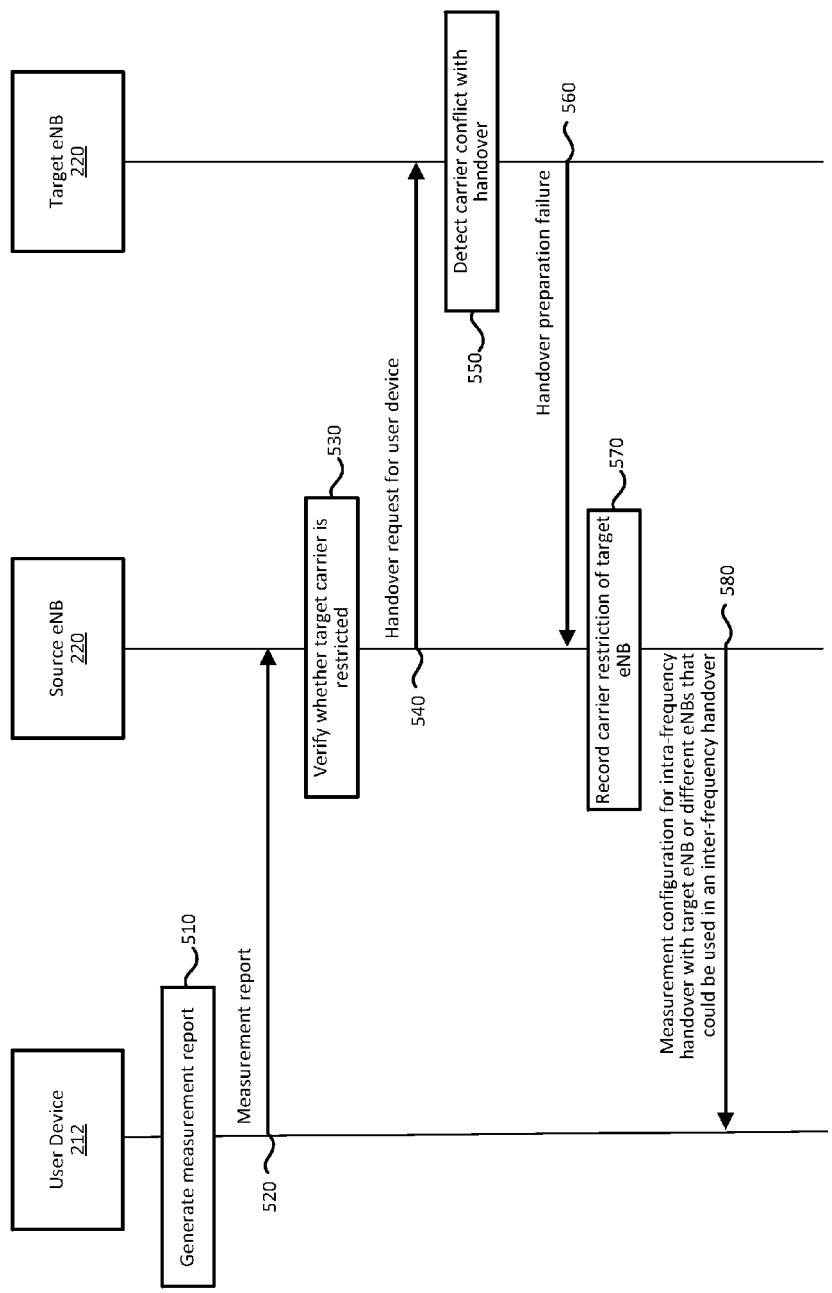
FIG. 5 is a sequence flow diagram of an example for responding to a carrier restriction.

FIG. 5 is a sequence flow diagram of an example for responding to a carrier restriction. As shown, FIG. 5 may include user device 212, source eNB 220, and target eNB 225.

As depicted, user device 212 may generate a measurement report (block 510). In some implementations, the measurement report may include information identifying eNBs 225 that user device 212 can detect and the signal strength of the eNBs 225. These may be the potential target eNBs. The information in the measurement report may be based on information requested by source eNB 220 (e.g., in a measurement configuration message provided to user device 212 by source eNB 220). User device 212 may send the measurement report to source eNB 220 (line 520).

Source eNB 220 may verify whether a target carrier is restricted (block 530). For example, source eNB 220 may access locally stored information about carrier restrictions of target eNB 225. Source eNB 220 may determine, based on the locally stored information, whether user device 212 would be prohibited from using the same primary carrier that user device 212 is currently using if user device 212 were transferred (e.g., via a handover procedure) to target eNB 225. For purposes of FIG. 5, assume that source eNB 220 has not yet discovered, or been informed of, a carrier restriction that has been imposed on target eNB 225. As such, the locally stored information of source eNB 220 may not indicate that transferring user device 212 to target eNB 225 would create a conflict with the carrier restriction at eNB 225.

Source eNB 220 may send a handover request, regarding user device 212, to target eNB 225 (line 540). Since source eNB 220 did not discover any carrier restrictions that would prohibit user device 212 from maintaining the same primary carrier that user device 212 is currently using, the handover request may include a request for an intra-frequency handover (e.g., a handover procedure where the primary carrier would not change). Upon receiving the handover request, target eNB 225 may detect a carrier conflict with the handover (block 550). For example, target eNB 225 may detect that having user device 212 maintain the same primary carrier as user device 212 used to communicate with source eNB 220 would create a conflict with a carrier restriction pertaining to target eNB 225.

Target eNB 225 may communicate a handover preparation failure message to source eNB 220 (block 560). The handover preparation failure message may indicate to source eNB 220 that the requested handover cannot be completed because doing so is prohibited by the carrier restriction imposed upon target eNB 225. The handover preparation failure message may also indicate whether the conflict pertains to the downlink carrier and/or the uplink carrier of the primary carrier used at eNB 220, that are not available at eNB 225. In response, source eNB 220 may record the carrier restriction that is prohibiting the intra-frequency handover (block 570). Doing so may enable source eNB 220 to be aware of the carrier restriction when considering subsequent handovers to target eNB 225.

Additionally, source eNB 220 may communicate a measurement configuration to user device 212 (line 580). The measurement configuration may request that user device 212 generate a measurement report with information detailed by the measurement configuration. For example, the measurement configuration may instruct user device 212 to obtain information regarding carriers that could be used in an inter-frequency handover with target eNB 225. In another example, the measurement configuration may instruct user device 212 to obtain information about the availability of other eNBs 225 that may be capable of participating in an intra-frequency handover with user device 212 (e.g., other potential target eNBs 225 that are not under the same frequency restriction as the initial target eNB 225).

Figure 6:
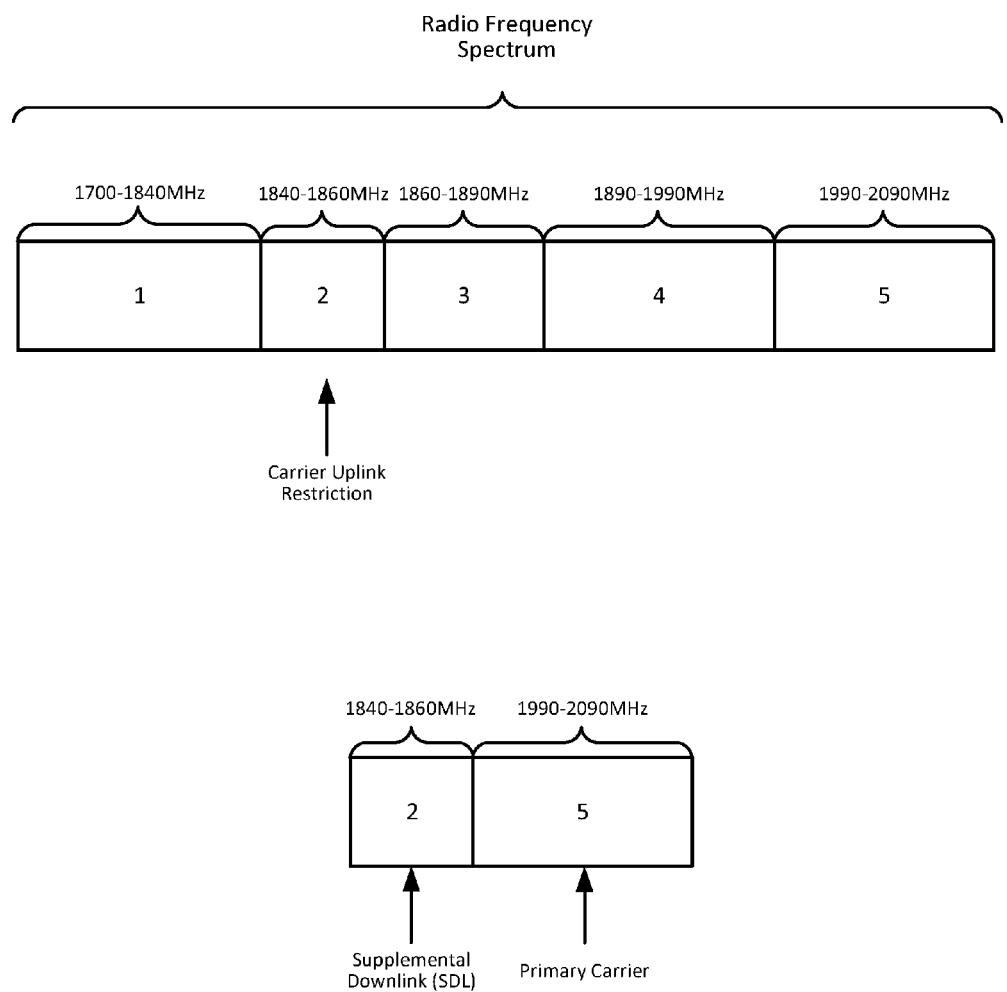
FIG. 6 is a block diagram of radio frequency bands used to create a primary carrier with a supplemental downlink (SDL) carrier.

FIG. 6 is a block diagram of radio frequency bands used to create a primary carrier with a SDL carrier. As shown, a spectrum of radio frequencies may be grouped into multiple frequency bands. Each band may include an interval of frequencies defined by a lower frequency and an upper frequency. For instance, in the example of FIG. 6, frequency band 1 includes frequencies between 1700 and 1840, while frequency band 2 includes frequencies between 1840 and 1860, and so on. For the purposes of FIG. 6, assume that user device 212 is using a primary carrier corresponding to frequency band 2 to communicate with source eNB 220 and that source eNB 220 intends to perform a handover of user device 212 to target eNB 225.

However, as shown in FIG. 6, assume also that a carrier restriction imposed upon target eNB 225 is prohibiting uplink carriers using frequency band 2 (i.e., radio frequencies between 1840 MHz and 1860 MHz). As such, source eNB 220 may cause an inter-frequency handover to occur so that user device 212 begins using a primary carrier corresponding to frequency band 5 (i.e., radio frequencies between 1990 MHz and 2090 MHz). Additionally, since the carrier restriction does not prohibit downlink carriers for frequency band 2, user device 212 may continue to use the downlink carrier for frequency range 2 as an SDL carrier, which may provide additional downlink capacity between user device 210 and target eNB 225. As such, the inter-frequency handover may provide user device 210 with a new primary carrier and a SDL carrier that is based on the primary carrier previously used by user device 212 to communicate with source eNB 220.

Figure 7:
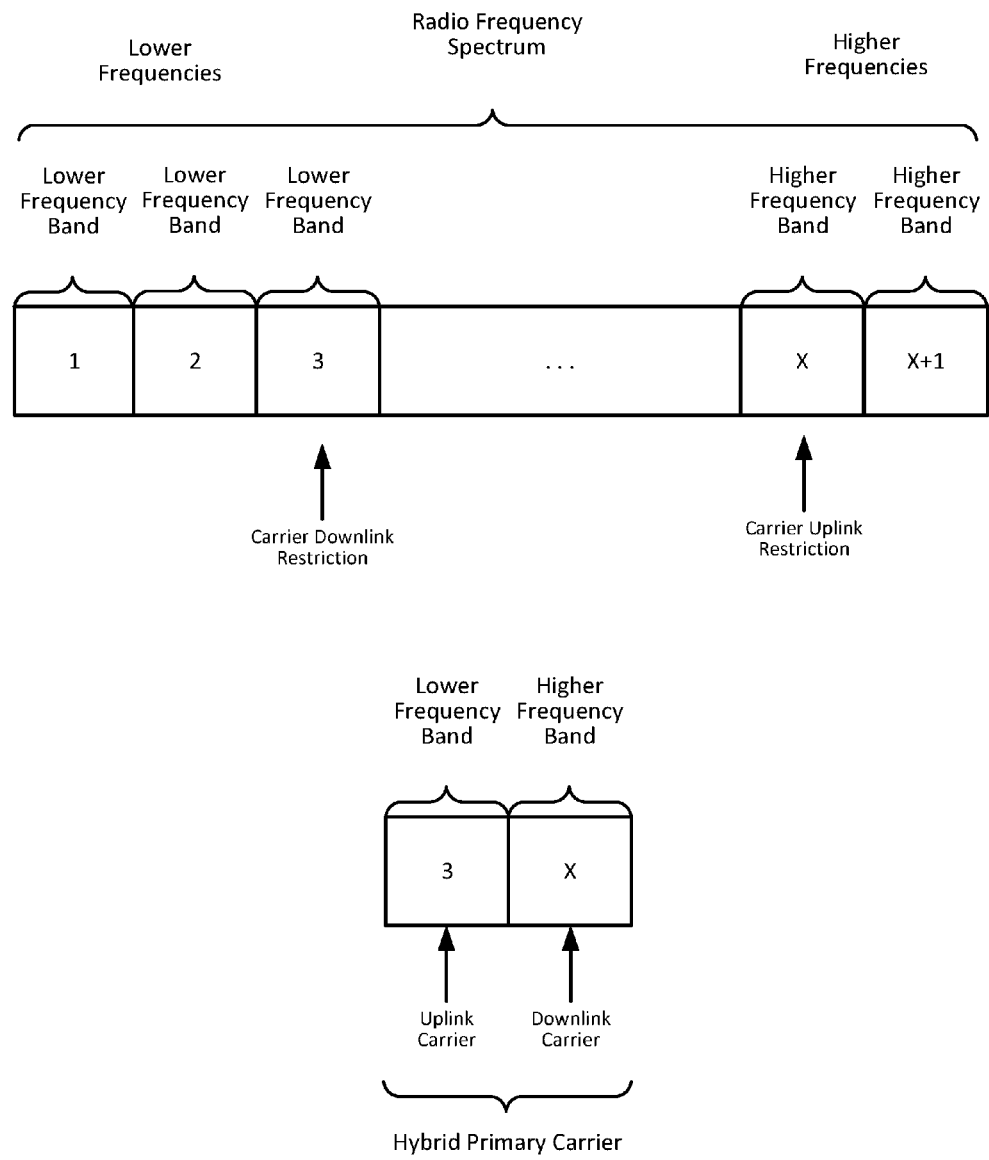
FIG. 7 is a block diagram of a radio frequencies used to create a hybrid primary carrier from a lower frequency band and a higher frequency band.

FIG. 7 is a block diagram of radio frequencies used to create a hybrid primary carrier from a lower frequency band and a higher frequency band. As shown, a spectrum of radio frequencies may be grouped into multiple frequency bands. Each band may include an interval of radio frequencies defined by a lower frequency and an upper frequency. For the purposes of the example of FIG. 7, assume that target eNB 225 includes a carrier downlink restriction on a lower frequency band (e.g., the 600 MHz band, where the wireless services portion of the band has a reinserted digital television (DTV) station into the downlink portion) and a carrier uplink restriction on a higher frequency band (e.g., a military incumbent that is within an uplink portion of the AWS-3 band). As such, an uplink carrier on the lower frequency band and a downlink carrier on the higher frequency band may be available for use.

eNB 220 may pair an orphaned uplink carrier on the lower frequency band (e.g., 600 MHz) with an orphaned downlink carrier of the higher frequency band to create a hybrid primary carrier. A hybrid primary carrier, as described herein, may include a primary carrier (e.g., an uplink carrier paired with a downlink carrier) that was created from disparate frequency bands that are subject to carrier restrictions. Creating hybrid primary carriers may help ensure that unpaired carriers do not go unused, in addition to providing other benefits as described below in the example of FIG. 8.

Figure 8:
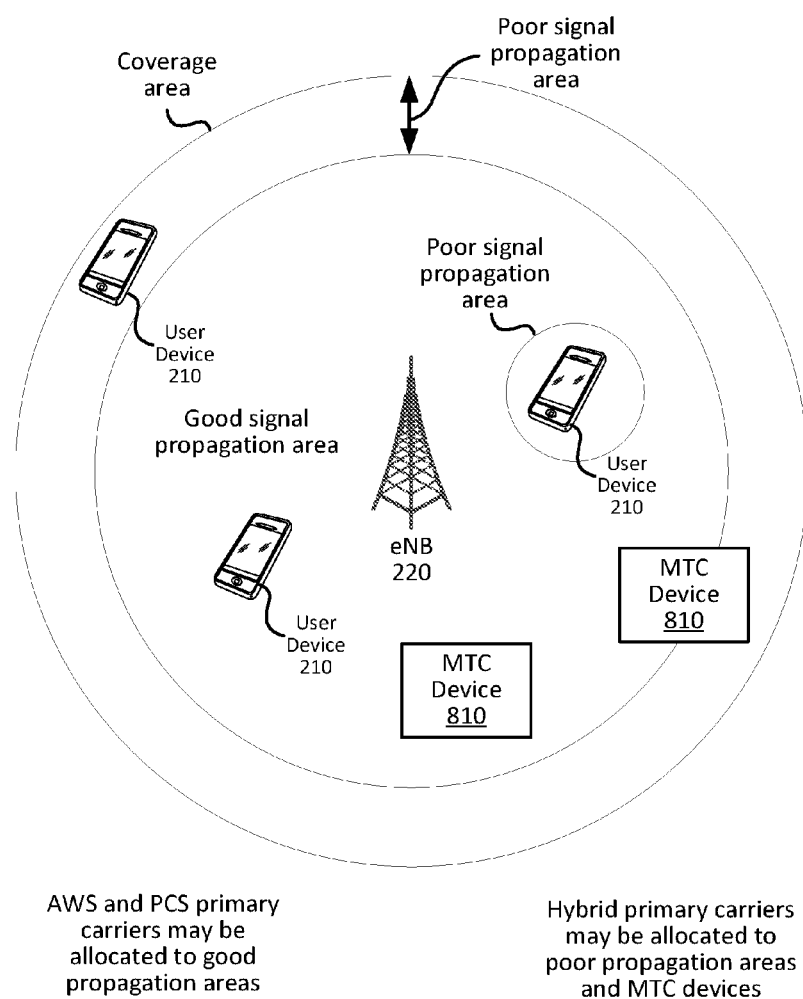
FIG. 8 is a diagram of an example implementation of a radio access network (RAN)

FIG. 8 is a diagram of an example implementation of a RAN. As shown, the RAN may include user devices 210, eNB 220, and machine-type-communication (MTC) devices 810. User devices 210 and eNB 220 are described above with reference to FIG. 2. MTC devices 810 may include a wireless communication device capable of gathering, processing, and communicating information, via an air interface, to eNB 220. Examples of an MTC device may include a sensor installed in a vehicle to gather usage information (e.g., mileage, speeds, locations, etc.) and communicate the usage information to a server device via eNB 220. Another example may include devices installed in a utilities meter (gas meter, electricity meter, etc.) to gather and report usage information to a server device via eNB 220. MTC devices 810 may include a device that frequently uploads small amounts of information to eNB 210. By contrast, user devices 210 may tend to download significantly more information from eNB 220 than upload information to eNB 220.

eNB 220 may be capable of using primary carriers that correspond to a variety of frequency bands. FIG. 9 is a table of an example of frequency bands that may correspond to primary carriers. For instance, as shown, eNB 220 may be capable of communicating using carriers in a Personal Communication System (PCS) frequency band, an Advanced Wireless Service (AWS) frequency band, and a variable band of frequencies representing hybrid primary carriers created by eNB 220. Primary carriers for PCS may be in a 1900 MHz band and may be used for voice, paging, messaging, and data services. Primary carriers for the AWS (e.g., AWS-1) may include uplink carriers between 1710 MHz and 1755 MHz and downlink carriers between 2110 MHz and 2155 MHz, and may be used for voice data services, video, and messaging services. Hybrid primary carriers may include a variety of frequencies depending on the carrier restrictions that are applied to eNB 220. For instance, if there is a downlink carrier restriction on 600 MHz carriers (e.g., 600 MHz band) and an uplink carrier restriction on 2000 MHz carriers, the hybrid primary carrier may include a 600 MHz uplink carrier and a 2000 MHz downlink carrier.

Returning again to FIG. 8, eNB 220 may be capable of allocating primary carriers to devices based on one or more factors. Examples of such factors may include the frequency bands of the primary carriers, the type of device (e.g., user devices 210 or MTC devices 810), and/or whether the device is located in a good signal propagation area or a poor signal propagation area. An example of a good signal propagation area may include a location within the coverage area where it is relatively easy to transmit a signal between a device and eNB 220. Examples of such locations may include a location where the device is somewhat close to eNB 220 without any obstacles (e.g., a hill, a building, etc.) between the device and eNB 220. By contrast, a poor signal propagation area may include a location within the coverage area where it is difficult to transmit a signal between a device (e.g., user device 210) and eNB 220). Examples of such locations may include near the outer edge of the coverage area, inside of a building, behind a hill (i.e., there is a hill located between the device and eNB 220), etc.

PCS and AWS primary carriers may be capable of communicating relatively large amounts of information because of the high frequency bands dedicated to PCS and AWS carriers. For the same reason, however, PCS and AWS carriers may require more power to transmit over large distances, which can be taxing to a battery-operated device such as user device 210. By contrast, a hybrid primary carrier may have strengths and weaknesses depending on the radio frequencies used for the uplink carriers and the downlink carriers.

For instance, a lower frequency uplink carrier (e.g., 600 MHz) may not be capable of communicating as much information as an uplink carrier of a high frequency uplink carrier (e.g., 2000 MHz); however, the lower frequency uplink carrier may require less power to transmit over long distances, into or out of buildings, and from other locations where signal propagation is poor. As such, a hybrid primary carrier that includes a low frequency uplink carrier may be beneficial to user devices 210 in poor signal propagation areas and/or MTC devices 810 that upload information to eNB 220 frequently but typically only in small amounts.

Additionally, if a low frequency uplink carrier is paired with a high frequency downlink carrier, the resulting hybrid primary carrier may have the long range, low power benefits in the uplink direction (e.g., for a low-powered transmitter of user device 210 and/or MTC device 810), but high data transfer capacity in the downlink direction (which may use a high-powered eNB transmitter). A user device 210 located in a building or near the edge of the coverage area, therefore, may benefit from a primary carrier that includes a low power, long distance uplink carrier and a high capacity data transfer of the downlink carrier, thereby conserving power while still satisfying the downlink-centric behaviors of user device 210. Furthermore, allocating hybrid primary carriers to certain devices may preserve other primary carriers (e.g., PCS or AWS primary carriers) for user devices 210 in more optimal conditions (e.g., in good signal propagation areas). As such, in addition to being able to create hybrid primary carriers based on carrier restrictions, eNB 220 may be capable of intelligently allocating primary carriers (e.g., PCS carriers, AWS carriers, and hybrid carriers) based on device type, signal propagation conditions, etc.

Figure 10:
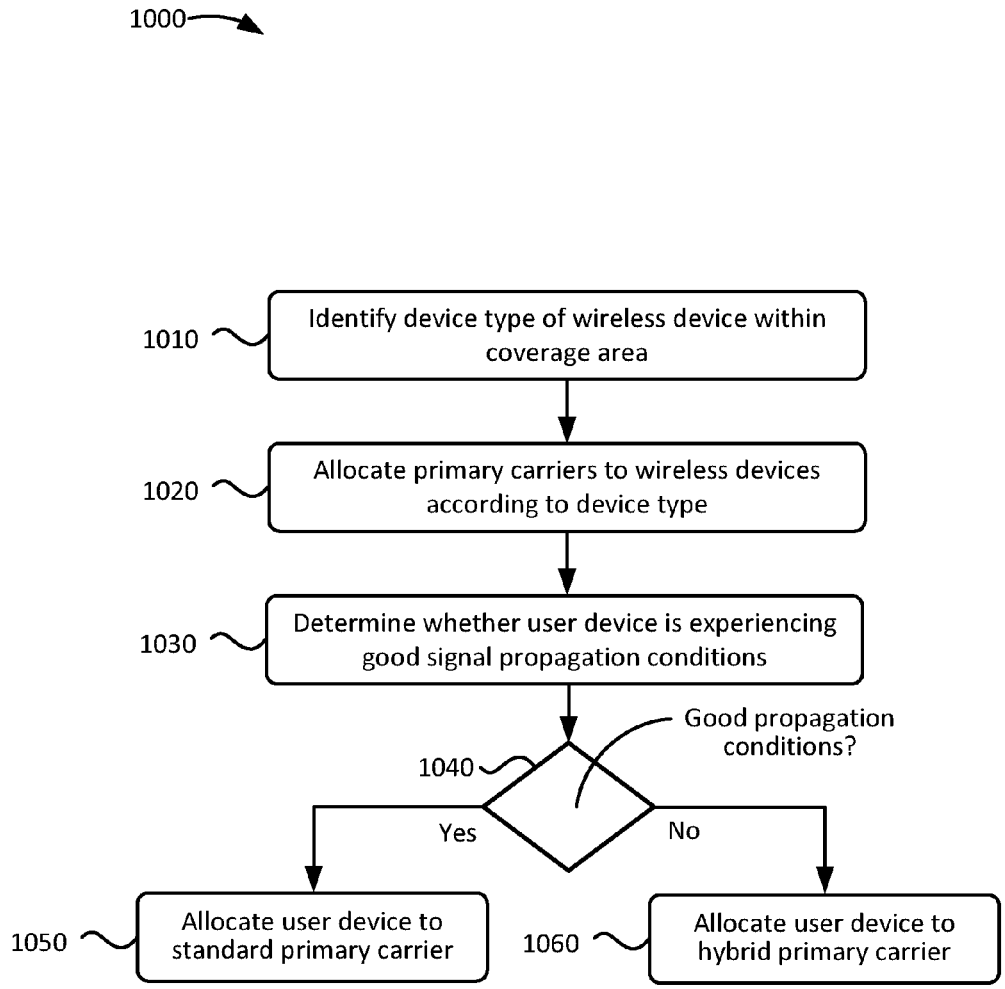
FIG. 10 is a flowchart diagram of an example process for allocating a primary carrier to a wireless device.

FIG. 10 is a flowchart diagram of an example process 1000 for allocating a primary carrier to a wireless device. In some implementations, process 1000 may be performed by eNB 220. In some implementations, process 1000 may be performed by eNB 220 in combination with one or more other devices of a core network.

As shown, process 1000 may include identifying a device type of a wireless device within a coverage area (block 1010). For example, eNB 220 may identify the types of devices that are located within a wireless coverage area of eNB 220. Examples of device types may include whether a particular device is a user device 211, an MTC device, etc. In some implementations, determining the device type may enable eNB 220 to predict the downlink and uplink behaviors of the corresponding device. For example, user device 211 may likely require greater downlink capacity than uplink capacity, while an MTC device may likely require more uplink capacity than downlink capacity.

Process 1000 may also include allocating primary carriers to wireless devices according to device type (block 1020). For instance, eNB 220 may allocate primary carriers with higher data transfer capabilities to user devices 211, while allocating primary carriers with lower data transfer capacities to MTC devices. For instance, eNB 220 may allocate PCS and AWS primary carriers to user devices 211, and a hybrid primary carrier with a lower uplink capacity to MTC devices 810. As such, eNB 220 may intelligently allocate carrier resources according to the anticipated needs of the wireless devices within the coverage area of eNB 220.

Process 1000 may also include determining whether user device 210 is experiencing good signal propagation conditions (block 1030). For instance, eNB 220 may determine whether user device 210 is in a location, within the coverage area, that makes it difficult for user device 210 to communicate with eNB 220. As mentioned above, with reference to FIG. 8, such a location may include being near the edge of the coverage area, inside a basement, behind a barrier (such as a hill or embankment), etc. When user device 211 is experiencing good signal propagation conditions (block 1040—Yes), process 1000 may include allocating a standard primary carrier to user device 211. Examples of a standard primary frequency may include a high data capacity carrier, such as a PCS primary carrier, an AWS primary carrier, etc. In some implementations, prior to allocating a standard primary carrier to user device 211, eNB 220 may verify that user device 211 is not already using a standard primary carrier (e.g., based on one or more metrics, such as a Received Signal Strength Indicator (RSSI), a Signal-to-Interference-Plus-Noise Ratio (SNIR), a Block Error Rate (BLER), etc.).

When user device 210 is experiencing poor signal propagation conditions (block 1040—No), process 1000 may include allocating a hybrid primary carrier to user device 210 (block 1060). As discussed above with reference to FIGS. 8 and 9, an example of a hybrid primary carrier may include a primary carrier that was created from a downlink carrier and an uplink carrier of frequency bands that are subject to carrier restrictions. For instance, a hybrid primary carrier may include a low frequency uplink carrier that may have less data transfer capacity than a high frequency carrier might have but may require less power to transmit over long distances or through obstacles (e.g., buildings).

The hybrid primary carrier may also include a high frequency downlink carrier that may have a greater data transfer capacity than a low frequency carrier but that may require more power to transmit over long distances or through obstacles. As such, eNB 220 may allocate such a hybrid primary carrier to user devices 210 that are experiencing poor signal propagation conditions. In some implementations, doing so may enable the user devices 210 to better communicate with eNB 220 in the uplink direction without requiring prohibitive battery consumption, while maintaining a high data transfer capacity in the downlink direction. Additionally, since eNB 220 may be connected to an electrical grid (instead of a battery, like user device 210), the power required to transmit the high frequency downlink carrier over long distances or through obstacles may not be a prohibiting factor.

Figure 11:
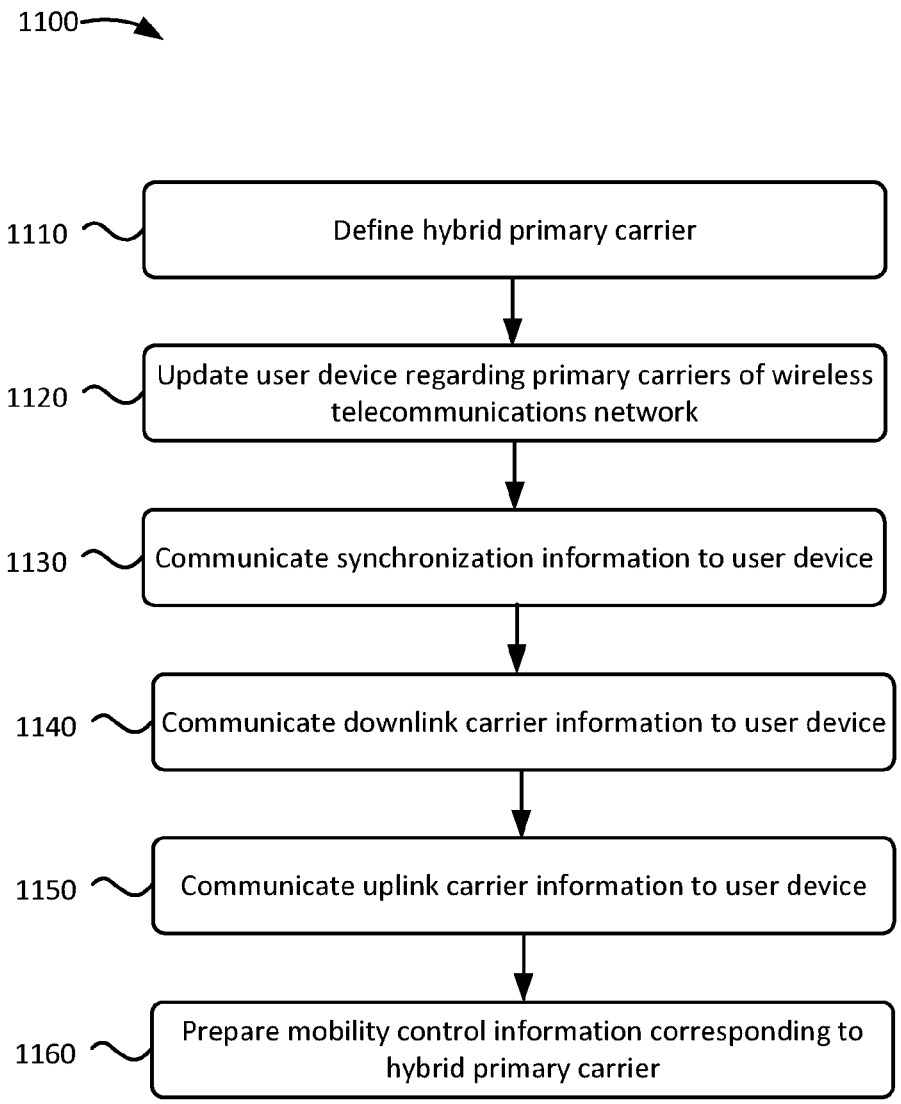
FIG. 11 is a flowchart diagram of an example process for allocating a hybrid primary carrier to a wireless device.

FIG. 11 is a flowchart diagram of an example process 1100 for allocating a hybrid primary carrier to a wireless device. In some implementations, process 1100 may be performed by eNB 220. In some implementations, process 1100 may be performed by one or more eNBs 220 in combination with one or more other devices of a core network As shown, process 1100 may include defining a hybrid primary carrier (block 1110). For example, eNB 220 may identify an unpaired uplink carrier and an unpaired downlink carrier that may be used to create a new primary carrier (e.g., a hybrid primary carrier). In addition, eNB 220 may determine one or more characteristics of the hybrid primary carrier. Examples of such information may include an uplink carrier frequency, a downlink carrier frequency, an uplink carrier bandwidth, a downlink carrier bandwidth, a number of physical resource blocks (PRBs) for the uplink carrier and the downlink carrier, etc.

Process 1100 may include updating user device 210 regarding primary carriers of a wireless telecommunications network (block 1120). For example, eNB 220 may provide user device 210 with information about how to search for network connectivity using available frequency bands and carriers. Examples of such information may include frequency bands that user device 210 may search within, an order of frequency bands to search, downlink channel numbers, etc. The information may correspond to a preferred service provider and one or more secondary service providers that user device 210 may use while roaming. As such, eNB 220 may provide user device 210 with information that enables user device 210 to search for a hybrid primary carrier.

Process 1100 may include communicating synchronization information to user device 210 (block 1130). For instance, eNB 220 may communicate timing information using a controlling downlink channel of the hybrid primary carrier. The timing information may include a physical identifier of eNB 220, a cell group number of eNB 220 (e.g., a physical layer cell identity group number), and synchronization information (e.g., time slot information and time frame information). In some implementations, user device 210 may use the information to become synchronized with eNB 220. After the timing synchronization is complete, user device 210 may be aware of the location of the cell's reference signals (e.g., the physical resource blocks (PRBs) dedicated to control information) and may be capable of decoding control information from eNB 220.

Process 1100 may include communicating downlink carrier information to user device 210 (block 1140). For example, eNB 220 may transmit information defining the downlink carrier of the hybrid primary carrier. The information may define the bandwidth of the downlink carrier in terms of a number of PRBs of the downlink carrier. eNB 220 may transmit the information using a control channel dedicated to control information.

Process 1100 may include communicating uplink carrier information to user device 210 (block 1150). For example, eNB 220 may communicate information to user device 210 regarding uplink control channels (which may control how user device 2108 communicates request to eNB 220). The uplink carrier information may define uplink access control messages an channels, such as a random access channel (RACH), idle mode paging configurations, a physical uplink control channel (PUCCH), a physical uplink shared channel (PUSCH), etc. The uplink carrier information may also include an uplink carrier frequency and an uplink bandwidth (e.g., by the number of PRBs). As such, the uplink carrier information may indicate to user device 210 the uplink carrier that is being paired with the downlink carrier to create the hybrid primary carrier.

Process 1100 may include preparing mobility control information corresponding to the hybrid primary carrier (block 1160). At some point after user device 212 is capable of communicating with eNB 225 via the primary hybrid carrier, eNB 220 may prepare a data set that will enable user device to undergo a handover procedure. The data set may define the hybrid primary carrier being used by user device 212. For instance, the data set may include a downlink carrier frequency, a downlink bandwidth, an uplink carrier frequency, and an uplink bandwidth. The downlink carrier frequency information and the uplink carrier frequency information may each include the number of PBRs corresponding to each carrier frequency. The downlink bandwidth information may include the number of PBRs corresponding to the downlink carrier. Similarly, the uplink bandwidth information may also include the number of PBRs corresponding to the uplink carrier. The downlink carrier frequency and the uplink carrier frequency may each be defined via an identifier, such as an evolved Universal Mobile Telecommunications Systems (UMTS) Terrestrial Radio Access (EUTRA) Absolute Radio-Frequency Channel Number (EARFCN). The data set may instruct user device 212 on how to communicate with, and successfully transfer to, another base station (e.g., a target eNB 225) as part of a handover procedure.

FIG. 12 is a diagram of example components of a device 1200. Each of the devices illustrated in FIGS. 1A, 2, 5, and 8 may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes (LEDs), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of lines, arrows, and/or blocks have been described with regard to FIGS. 1B, 3, 4, 5, and 10 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), a microprocessor with firmware or software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
communicating, by a first base station of a wireless telecommunications network, with a user device via a first primary carrier;
identifying, by the first base station, a second base station to which the user device is to be transferred as part of a first handover procedure that establishes communication between the user device and the second base station via the first primary carrier;
determining, by the first base station, whether the second base station is prohibited from using first primary carrier to communicate with the user device; and
when the second base station is not prohibited from using the first primary carrier,
initiating, by the first base station, a transfer of the user device to the second base station in accordance with the first handover procedure, wherein initiating the transfer of the user device in accordance with the first handover procedure includes:
providing the user device with instructions for initiating communication with the second base station via the first primary carrier, and
receiving, in response to the user device initiating communication with the second base station, a notification, from the second base station, that the second base station is prohibited from using the first primary carrier to communicate with the user device, and
when the second base station is prohibited from using the first primary carrier,
initiating, by the first base station, a transfer of the user device to the second base station in accordance with a second handover procedure that establishes communication between the user device and the second base station via a second primary carrier that the second base station is not prohibited from using.

2. The method of claim 1, wherein the determining of whether the second base station is prohibited from using the first primary carrier includes:
accessing information representing at least one base station, within a wireless telecommunications network, that is prohibited from using at least one primary carrier.

3. The method of claim 2, wherein the information was created by the first base station in response to initiating a handover procedure with the at least one base station and, in response thereto, receiving a notification, from the at least one base station, that the at least one base station is prohibited from using the at least one primary carrier.

4. The method of claim 1, further comprising:
creating a record of the second base station being prohibited from using the first primary carrier, and
storing the record in a data repository for records of base stations prohibited from using primary carriers.

5. The method of claim 1, further comprising:
when receiving the notification that the second base station is prohibited from using the first primary carrier, stopping the transfer of the user device in accordance with the first handover procedure by communicating a handover cancelation message to the user device.

6. The method of claim 1, wherein the second base station is prohibited from using an uplink carrier of the first primary carrier.

7. The method of claim 6, wherein the second handover procedure includes aggregating a downlink carrier of the first primary carrier to the second primary carrier as a supplemental downlink carrier (SDL).

8. The method of claim 1, further comprising:
prior to communicating with the user device via a first primary carrier,
defining the first primary carrier as an unpaired uplink carrier and an unpaired downlink carrier,
notifying the user device of the availability of the first primary carrier for communicating with base stations within the wireless telecommunications network,
communicating, to the user device, synchronization information regarding the unpaired downlink carrier,
communicating, to the user device via the unpaired downlink carrier, information defining the unpaired downlink carrier,
communicating, to the user device via the unpaired downlink carrier, information defining the unpaired uplink carrier, and
communicating, with the user device, by sending information to the user device via the unpaired downlink carrier and by receiving information from the user device via the unpaired uplink carrier.

9. The method of claim 8, wherein the unpaired uplink carrier corresponds to a 600 Megahertz (MHz) frequency and the unpaired downlink carrier corresponds to a 2180 MHz to 2200 MHz frequency band.

10. A base station of a wireless telecommunications network, the base station comprising:
a non-transitory memory device storing a plurality of processor-executable instructions; and
a processor configured to execute the processor-executable instructions, wherein executing the processor-executable instructions cause the processor to:
communicate with a user device via a first primary carrier;
identify a second base station to which the user device is to be transferred as part of a first handover procedure to establish communication between the user device and the second base station via the first primary carrier;
determine whether the second base station is prohibited from using first primary carrier to communicate with the user device; and
when the second base station is not prohibited from using the first primary carrier,
initiate a transfer of the user device to the second base station in accordance with the first handover procedure, wherein executing the processor-executable instructions, to initiate the transfer of the user device in accordance with the first handover procedure, causes the processor to:
provide the user device with instructions for initiating communication with the second base station via the first primary carrier, and
receive, in response to the user device initiating communication with the second base station, a notification, from the second base station, that the second base station is prohibited from using the first primary carrier to communicate with the user device, and
when the second base station is prohibited from using the first primary carrier,
initiate a transfer of the user device to the second base station in accordance with a second handover procedure to establish communication between the user device and the second base station via a second primary carrier that the second base station is not prohibited from using.

11. The base station of claim 10, wherein, to determine whether the second base station is prohibited from using first primary carrier, the processor-executable instructions cause the processor to:
access information representing at least one base station, within a wireless telecommunications network, that is prohibited from using at least one primary carrier.

12. The base station of claim 11, wherein the information was created by the first base station in response to initiating a handover procedure with the at least one base station and, in response thereto, receiving a notification, from the at least one base station, that the at least one base station is prohibited from using the at least one primary carrier.

13. The base station of claim 10, the processor-executable instructions further cause the processor to, when receiving the notification that the second base station is prohibited from using the first primary carrier, executing the processor-executable instructions further causes the processor to:
  create a record of the second base station being prohibited from using the first primary carrier,
  store the record in a data repository for records of base stations prohibited from using primary carriers, and
  stop the transfer of the user device in accordance with the first handover procedure with a handover cancelation message sent to the user device.

14. The base station of claim 10, wherein the second handover procedure includes aggregating a downlink carrier of the first primary carrier to the second primary carrier as a supplemental downlink carrier (SDL).

15. The base station of claim 10, wherein, prior to causing the processor to communicate with the user device via a first primary carrier, the processor-executable instructions cause the processor to:
  define the first primary carrier as an unpaired uplink carrier and an unpaired downlink carrier,
  notify the user device of the availability of the first primary carrier for communicating with base stations within the wireless telecommunications network,
  communicate, to the user device, synchronization information regarding the unpaired downlink carrier,
  communicate, to the user device via the unpaired downlink carrier, information defining the unpaired downlink carrier,
  communicate, to the user device via the unpaired downlink carrier, information defining the unpaired uplink carrier, and
  communicate, with the user device, by sending information to the user device via the unpaired downlink carrier and by receiving information from the user device via the unpaired uplink carrier.

16. A first base station of a wireless telecommunications network, comprising:
  a non-transitory computer-readable medium storing a plurality of processor-executable instructions; and
  a processor configured to execute the processor-executable instructions, wherein executing the processor-executable instructions causes the processor to:
    define a first primary carrier as an unpaired uplink carrier and an unpaired downlink carrier, the unpaired uplink and downlink carriers corresponding to different frequency bands;
    communicate with a user device via the first primary carrier;
    identify a second base station to which the user device is to be transferred as part of a first handover procedure to establish communication between the user device and the second base station via the first primary carrier;
    initiate a transfer of the user device to the second base station in accordance with the first handover procedure;
    receive, in response to the initiation of the transfer, a notification, from the second base station, that the second base station is prohibited from using the first primary carrier, wherein, based on the notification that the second base station is prohibited from using the first primary carrier, the processor-executable instructions further cause the processor to:
      create a record of the second base station being prohibited from using the first primary carrier,
      initiate a timer for storing the record for a preselected duration,
      based on an expiration of the timer:
        determine whether the second base station is still prohibited from using the first primary carrier,
        when the second base station is still prohibited from using the first primary carrier, reset the timer for storing the record, and
        when the second base station is no longer prohibited from using the first primary carrier, delete the record; and
    initiate, in response to the notification, a transfer of the user device to the second base station in accordance with a second handover procedure to establish communication between the user device and the second base station via a second primary carrier that the second base station is not prohibited from using.

17. The first base station of claim 16, wherein the instructions further cause the processor to:
  determine that the user device is located in a poor signal propagation area of a coverage area of the first base station, and
  allocate, based on the user device being located in the poor primary signal propagation area, the first primary carrier to the user device.

18. The first base station of claim 16, wherein the instructions further cause the processor to:
  identify a device type for each wireless device, of a plurality of wireless devices, located within a coverage area of the first base station;
  allocate the first primary carrier to at least one wireless device, of the plurality of wireless devices, that corresponds to a preselected device type;
  determine a signal propagation quality corresponding to each wireless device, of the plurality of wireless devices, that is not using the first primary carrier, and
  allocate the first primary carrier to the at least one wireless device that corresponds to a poor signal propagation area.

19. The method of claim 1, further comprising:
  when the second base station is prohibited from using the first primary carrier:
    creating a record of the second base station being prohibited from using the first primary carrier,
    initiating a timer for storing the record for a preselected duration,
    based on an expiration of the timer:
      determining whether the second base station is still prohibited from using the first primary carrier,
      when the second base station is still prohibited from using the first primary carrier, resetting the timer for storing the record, and
      when the second base station is no longer prohibited from using the first primary carrier, deleting the record.

20. The base station of claim 10, wherein executing the processor-executable instructions further causes the processor to:
  when the second base station is prohibited from using the first primary carrier:
    create a record of the second base station being prohibited from using the first primary carrier,
    initiate a timer for storing the record for a preselected duration,
    based on an expiration of the timer:
      determine whether the second base station is still prohibited from using the first primary carrier,
      when the second base station is still prohibited from using the first primary carrier, reset the timer for storing the record, and when the second base station is no longer prohibited from using the first primary carrier, delete the record.

\* \* \* \* \*